United States Patent [19]

Perettie

[11] 3,903,097

[45] Sept. 2, 1975

[54] PROCESS FOR THE PRODUCTION OF 2-CYANOPYRIDINES
[75] Inventor: Donald J. Perettie, Midland, Mich.
[73] Assignee: The Dow Chemical Company, Midland, Mich.
[22] Filed: Apr. 5, 1973
[21] Appl. No.: 348,362

[52] U.S. Cl. ............................................. 260/294.9
[51] Int. Cl.$^2$ .................................... C07D 213/60
[58] Field of Search ................................. 260/294.9

[56] References Cited
UNITED STATES PATENTS
2,494,204    1/1950    Robinson et al. ................ 260/294.9

OTHER PUBLICATIONS
Janz et al., Chem. Abstracts, Vol. 41, p. 6886b–g, (1947).

Primary Examiner—Alan L. Rotman
Attorney, Agent, or Firm—David H. Fifield

[57] ABSTRACT

A process is disclosed for the preparation of 2-cyanopyridines by contacting cyanogen and a 1,3-butadiene at elevated temperatures, about 450°–700°C., suitably for about 1–75 seconds in molar ratios of greater than 2:1, preferably after preheating the reactants independently and with contacting at superatmospheric pressures. Efficiency, short residence times and relatively inexpensive reactants make the invention economically preferred to present methods for production of 2-cyanopyridines.

15 Claims, No Drawings

PROCESS FOR THE PRODUCTION OF 2-CYANOPYRIDINES

BACKGROUND OF THE INVENTION

1. Field of the Invention:

The invention is a process for the production of 2-cyanopyridines by a Diels-Alder-type condensation reaction. In this invention, cyanogen is employed as the dieneophilic reactant and a 1,3-butadiene is employed as the diene reactant. Reactions of this nature are well summarized by G. J. Janz in Chapter 4 of 1,4-Cycloaddition Reactions, Hamer, ed. (1967) and Brody and Ruby in Chapter 2 of Pyridine and Its Derivatives, Klingsberg, ed. (1960). Heretofore, 2-cyanopyridines have been commercially produced mainly by the ammoxidation of 2-picolines which are normally obtained from coal tars.

2. Description of the Prior Art:

The nearest art known to the applicant is Canadian Pat. No. 460,710 issued to I. M. Robinson and G. J. Janz (1949) and its equivalent U.S. Pat. No. 2,494,204 (1950). The Canadian patent teaches the reaction of cyanogen with 1,3-dienes but only at about 1:1 molar ratio. It appears that the data in the Canadian patent has been incorporated in papers by G. J. Janz et al. to the Canadian Journal of Research, B25:272; 283 (1947), with some additions.

A similar reaction of certain organic nitriles and hydrogen cyanide with 1,3-dienes in the presence of alumina catalysts is taught by C. A. Weisgerber, U.S. Pat. No. 2,549,651 (1951); quantitative results are not reported.

The cyanogen-butadiene reaction and related nitrile-butadiene reactions are reported in a paper by P. J. Hawkins and G. J. Janz to the Journal of the Chemical Society (London), (1949):1479; reactions at 2–3:1 molar ratios are reported at 400°C. with no apparent beneficial effect from the high ratios. The effect of catalysis on nitrile-butadiene reactions is reported by the same authors in the same journal at page 1485.

SUMMARY

A process of making 2-cyanopyridines by contacting Reactant I, cyanogen, and Reactant II, a 1,3-butadiene, for about 1 to about 75 seconds at a temperature of about 450°C. to about 700°C., in the Reactant I:Reactant II molar ratio of greater than about 2:1 is disclosed. Use of superatmospheric pressure in the reaction zone and independent preheating of each reactant is preferred. In a preferred embodiment, cyanogen and 1,3-butadiene, in about 3:1 to about 10:1 molar ratio are contacted for about 5 to about 35 seconds in the reaction zone at about 500°C. to about 575°C. under a pressure of about 1 to about 5 atmospheres; the cyanogen having been independently preheated to about 600°C.–700°C. and the 1,3-butadiene having been independently preheated to about 300°C.–325°C. prior to contacting. High product distribution for 2-cyanopyridinic product and high conversion of Reactant II are exhibited by the process.

DETAILED DESCRIPTION

REACTANTS

Compounds represented by the formula

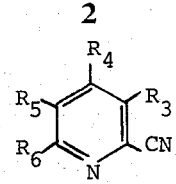

where $R_3$, $R_4$, $R_5$ and $R_6$ are independently hydro-, cyano-, halo-, lower alkyl-, lower haloalkyl-, lower phenylalkyl- or lower alkoxy- substituents, may be prepared from the reaction of Reactant I, cyanogen, with Reactant II, a 1,3-butadiene represented by the formula

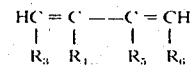

wherein $R_3$, $R_4$, $R_5$ and $R_6$ are as defined above. Reactant II is preferably a 1,3-butadiene wherein two of $R_3$, $R_4$, $R_5$ and $R_6$ are hydro-substituents and the other two are independently hydro-, cyano-, halo-, lower alkyl-, lower haloalkyl-, lower phenylalkyl- or lower alkoxy-substituents. Included are compounds such as cyano- and dicyano-1,3-butadienes; halo- and dihalo-1,3-butadienes; alkyl- and dialkyl-1,3-butadienes; haloalkyl- and di(haloalkyl)-1,3-butadienes; phenylalkyl- and di(phenylalkyl)-1,3-butadienes; alkoxy- and di(alkoxy)-1,3-butadienes; alkyl-halo-1,3-butadienes; alkyl-cyano-1,3-butadienes; alkyl-haloalkyl-1,3-butadienes; alkyl-phenylalkyl-1,3-butadienes; alkyl-alkoxy-1,3-butadienes; cyano-halo-1,3-butadienes; cyano-haloalkyl-1,3-butadienes; cyano-phenylalkyl-1,3-butadienes; cyano-alkoxy-1,3-butadienes; halo-haloalkyl-1,3-butadienes; halo-phenylalkyl-1,3-butadienes; halo-alkoxy-1,3-butadienes; haloalkyl-phenylalkyl-1,3-butadienes; haloalkyl-alkoxy-1,3-butadienes; and phenylalkyl-alkoxy-1,3-butadienes. Lower alkyl-, lower haloalkyl- lower phenylalkyl- and lower alkoxy-substituents as used herein, mean substituents the alkyl-portion of which are comprised of from one to about four carbon atoms. By halo-, wherever the term is used, is meant chloro-, bromo-, iodo- or fluoro-substituents. Preferred are hydro-, cyano-, chloro-, methyl-, ethyl-, chloromethyl-, benzyl-, methoxy- and ethoxy-substituents.

REACTOR AND PREHEATERS

The reactor employed is suitably any continuous flow reaction vessel which may be constructed of practically any good heat-conducting material which will withstand reaction temperatures of less than about 700°C. High silica glass, ASTM No. 316 stainless steel, ASTM No. 410 stainless steel, and the like, are suitable materials. The reactants are charged at one end of the reactor, passed through a reaction zone which is maintained at the desired reaction temperature and the gaseous product-reactant mixture is withdrawn from the other end of the reactor.

Reaction products are recovered by condensing the effluent gas with a series of low temperature traps. The effluent gas consists of a mixture of uncombined Reactants I and II, 2-cyanopyridinic products, vinylcyclohexenes, aromatics and other by-products. The 2-cyanopyridinic products and the by-products are suitably recovered by passing the effluent gas through a water-jacketed condenser and an ice water cooled trap. The reactants and lower boiling by-products may be removed by a subsequent low temperature trap, suitably a dry-ice or liquid nitrogen trap, or by chemical scrubbing.

In a preferred mode of practicing the invention, the production of vinylcyclohexenes, aromatic and tar byproducts can be reduced by independently heating each reactant, hereinafter preheating, before introducing them into the reaction vessel. The reactants are then mixed thoroughly, suitably in the beginning of the reaction zone or outside the reaction zone for a very short time immediately before the reactants are introduced into the reaction zone. Reactant I, cyanogen, preferably is preheated to a temperature above that subsequently employed in the reaction zone, suitably to about 600°C.–700°C. Reactant II is preheated to about the temperature at which it begins to dimerize; for 1,3-butadiene, suitably about 300°–325°C. If Reactant II does not dimerize below the reaction temperature, preheating at reaction temperature is suitable. The preferred preheat-temperature for cyanogen is such that when the desired amounts of cyanogen and Reactant II are mixed, heat transfer between the two reactants occurs and an isotherm is established at about the reaction temperature to be employed.

REACTION PARAMETERS

Reactants I and II may suitably be contacted at a reaction temperature of about 450°C. to about 700°C. A temperature of about 500°C. to about 575°C. is preferred. The reactants are contacted at the reaction temperature suitably for from about 1 second to about 75 seconds. At the preferred temperature, a contact time of about 5 to about 35 seconds is preferable.

While the reactants may be contacted in the Reactant I:Reactant II molar ratio of about 1:1, as the prior art teaches, it has been discovered that increasing this ratio will result in higher 2-cyanopyridinic product distribution. Substantial improvement is observed at molar ratios greater than about 2:1 and while no upper limit on the molar ratio with regard to operability is implied, a molar ratio of Reactant I:Reactant II of about 3:1 to about 10:1 is preferred.

It has further been discovered that contacting at the reaction temperature under superatmospheric pressures will improve the conversion of Reactant II. Pressure of 1 to about 60 atmospheres may be employed while a pressure of 1 to about 5 atmospheres is employed in a preferred mode of practicing the invention. For best results, the pressure chosen should be less than the vapor pressures of the reactants at the selected reaction temperature to maintain both reactants in the vapor phase.

DESCRIPTION OF SPECIFIC EMBODIMENTS OF THE INVENTION

In Examples 1 through 36, the invention process was carried out in a 200 ml. coil reaction vessel composed of ½ inch internal diameter Vycor (a trademark of the Corning Glass Company) silica tubing. The reaction zone, which comprised essentially all of the coil, was heated by an electric furnace which enclosed the coil. Reactants I and II, in specified molar ratios, were mixed and then passed to a preheater via a precalibrated rotometer, heated to about 325°C. and then introduced into the reaction zone where they were maintained at the reaction temperature for residence times specified below. Upon exit from the reaction zone, the gaseous mixture of 2-cyanopyridinic product, by-products and unreacted I and II was passed through a water-cooled condenser into an ice water-cooled flask and uncondensed I and II were passed on to a scrubber and removed with sodium hydroxide solution. The scrubber exhaust and all possible gas exits should be equipped with hydrogen cyanide detection devices for safe operation.

In Examples 28, 29 and 30, the pressure specified was applied to the reactants by constriction of the exit conduit from the reaction vessel.

The crude liquid product recovered from the ice water-cooled trap was analyzed by vapor phase chromatography with an ortho-xylene internal standard; results reported are based on these analyses.

In reporting results, terms employed are as follows:

$$\text{2-Cyanopyridinic Product Distribution} = \frac{\text{Weight of 2-Cyanopyridinic Product}}{\text{Weight of Crude Liquid Product}} \times 100$$

$$\text{Yield of 2-Cyanopyridinic Product} = \frac{\text{Moles of 2-Cyanopyridinic Product}}{\text{Moles of Reactant II Fed}} \times 100$$

$$\text{Reactant II Conversion} = \frac{\text{Reactant II Moles (Fed-Recovered)}}{\text{Reactant II Moles Fed}} \times 100$$

In Examples 1 through 36, actual recovery of Reactant II was measured only in Examples 1, 3, 4, 5 and 8. In the other examples, recovery of Reactant II was approximated by calculating the total amount of Reactant II required to produce the known amounts of product and by-products recovered. This approximation is relatively accurate since material balances were about 90 or 95% in most examples.

Yields and conversions, as reported, are based on Reactant II since Reactant I is present in I:II molar ratios of about unity or greater, thereby making the quantity of II rather than I the limiting factor in determining process "efficiency." This is especially true since Reactant II is believed to be involved in side reactions of a dimerization nature which produce vinylcyclohexenes and aromatics and Reactant I is believed to be significantly involved only in the reaction with II to form desired 2-cyanopyridinic product.

Residence time, as defined above, has been corrected to allow for different reaction temperatures and for superatmospheric pressure where applicable. Reactant I:Reactant II molar ratios have been determined by measured input flow rates of the two reactants.

EXAMPLE 1

Cyanogen and 1,3-butadiene in their vapor phases were passed to a preheater, through precalibrated rotometers, at flow rates of 0.15 and 0.05 liter per minute, respectively, where they were mixed and heated to about 325°C. The gaseous mixture, as a continuous stream, was thereafter fed to the Vycor glass coil reaction vessel. In the reaction zone, the temperature of the mixed reactants was maintained at 575°C. with residence time in the reaction zone being about 19.4 seconds. The reaction vessel effluent gas was thereafter passed through a water-cooled condenser into an ice water-cooled flask where a brownish-colored crude liquid product was recovered. The remaining gas was passed on to a scrubber and there neutralized with about a 10% caustic solution. A total of 41.8 g. (0.81 mole) of cyanogen and 14.5 g. (0.27 mole) of 1,3-butadiene were passed through the reaction vessel with 1.4 g. (0.026 mole) of 1,3-butadiene being recovered after scrubbing. Of a total 22.7 g. of crude liquid product recovered, 18.9 g. (0.18 mole) were determined to be 2-cyanopyridine by vapor phase chromatography. Based on these quantities, the distribution of 2-cyanopyridine in the crude liquid was determined to be 83.4% with a yield of 2-cyanopyridine of 68.1%. Actual conversion of Reactant II, 1,3-butadiene, was 90%. Approximate conversion of 1,3-butadiene, determined as described above, was calculated to be 86.1%.

EXAMPLES 2 THROUGH 30

In the manner described in Example 1, cyanogen and Reactant II were reacted at various temperatures, residence times and molar ratios, as set forth in Table I, below. In Examples 28, 29 and 30, the reactants were subjected to superatmospheric pressures of from 0.5 to 10 pounds per square inch, gauge (psig.), by constricting the opening of the reaction vessel exhaust conduit.

TABLE I

REACTION OF CYANOGEN AND 1,3-BUTADIENE

| Example Number | Reaction temp. (°C) | Residence Time (sec.) | Reactant I Reactant II (molar ratio) | 2-Cyanopyridine Product Distribution | Yield | Reactant II Conversion (approximate) | Comments |
|---|---|---|---|---|---|---|---|
| 1 | 575 | 19.4 | 3 | 83.4 | 68.1 | 86.1 | 90% actual conversion of Reactant II |
| 2 | 550 | 19.4 | 3 | 81.2 | 68.3 | 90.6 | |
| 3 | 525 | 19.4 | 3 | 82.0 | 42.2 | 58.3 | 66% actual conversion of Reactant II |
| 4 | 525 | 14.8 | 3 | 73.7 | 25.2 | 40.2 | 40% actual conversion of Reactant II |
| 5 | 575 | 14.8 | 3 | 89.1 | 57.1 | 70.6 | 73% actual conversion of Reactant II |
| 6 | 525 | 14.8 | 4 | 72.0 | 25.9 | 39.8 | |
| 7 | 575 | 14.8 | 4 | 76.4 | 45.5 | 62.5 | |
| 8 | 600 | 10.2 | 3 | 73.4 | 49.5 | 73.0 | 80% actual conversion of Reactant II |
| 9 | 450 | 27.8 | 1 | 49.1 | 15.1 | 43.4 | |
| 10 | 450 | 27.8 | 2 | 80.6 | 24.4 | 37.0 | |
| 11 | 475 | 27.8 | 1 | 49.5 | 18.5 | 52.1 | |
| 12 | 475 | 27.8 | 2 | 66.1 | 21.5 | 41.2 | |
| 13 | 500 | 27.8 | 1 | 50.6 | 26.9 | 71.5 | |
| 14 | 500 | 27.8 | 2 | 60.2 | 28.7 | 59.1 | |
| 15 | 565 | 19.4 | 1 | 45.9 | 40.3 | ~100 | |
| 16 | 550 | 19.4 | 2 | 71.2 | 54.7 | 87.6 | |
| 17 | 565 | 10.2 | 1 | 44.8 | 23.9 | 66.2 | |
| 18 | 575 | 10.2 | 2 | 90.3 | 39.2 | 47.8 | |
| 19 | 585 | 10.2 | 1 | 49.7 | 31.5 | 74.6 | |
| 20 | 620 | 10.2 | 1 | 40.9 | 33.8 | ~100 | |
| 21 | 615 | 6.4 | 2 | 57.8 | 35.3 | 70.2 | |
| 22 | 640 | 6.4 | 1 | 40.8 | 26.7 | 82.3 | |
| 23 | 640 | 6.4 | 2 | 55.1 | 43.5 | 92.2 | |
| 24 | 660 | 4.6 | 1 | 34.0 | 20.2 | 76.0 | |
| 25 | 660 | 4.6 | 2 | 43.4 | 28.9 | 78.3 | |
| 26 | 660 | 2.9 | 1 | 30.5 | 13.9 | 59.2 | |
| 27 | 660 | 2.9 | 2 | 47.7 | 24.8 | 61.5 | |
| 28 | 550 | 32 | ~2–3 | 78.0 | 69.4 | 90.1 | 10 psig. Pressure applied |
| 29 | 550 | 32 | ~2–3 | 74.0 | 64.7 | 90.4 | 10 psig. to reactants |
| 30 | 550 | 19.4 | ~2–3 | 72.7 | 42.5 | 63.0 | 0.5 psig. in reaction zone |

In Examples 31 through 36, cyanogen was reacted with one of 1,3-hexadiene and 3-methyl-1,3-pentadiene, both 1,3-butadienes as that term is used herein. The reactions were carried out as in Examples 1 through 30 and the results are set forth in Table II.

TABLE II

REACTION OF CYANOGEN WITH 1,3-HEXADIENE AND 3-METHYL-1,3-PENTADIENE

| Example Number | Reaction Temp. (°C) | Residence Time (sec.) | Reactant I Reactant II (molar ratio) | 2-Cyanopyridinic Product Distribution | Yield | Reactant II Conversion (approximate) | Comments |
|---|---|---|---|---|---|---|---|
| 31 | 500 | 20 | 1.9 | 66.2 | 43.1 | 68 | Reactant II = 1,3-hexadiene |
| 32 | 550 | 15 | 2.0 | 54.3 | 36.0 | 69 | Reactant II = 1,3-hexadiene |
| 33 | 500 | 20 | 1.9 | 83.8 | 53.0 | 43.3 | Reactant II = 3-methyl-1,3-pentadiene |
| 34 | 550 | 20 | 1.9 | 87.8 | 57.5 | 61.7 | Reactant II = 3-methyl-1,3-pentadiene |
| 35 | 500 | 15 | 2.0 | 79.8 | 51.6 | 33.1 | Reactant II = 3-methyl-1,3-pentadiene |
| 36 | 550 | 15 | 2.0 | 81.6 | 57.8 | 56.4 | Reactant II = 3-methyl-1,3-pentadiene |

EXAMPLE 37 - OTHER 1,3-BUTADIENES

In the manner described for Examples 1 through 36, above, the following 1,3-butadienes are contacted with cyanogen at about 525°C. to about 575°C. for about 5 to about 35 seconds residence time in cyanogen:Reactant II molar ratios of greater than about 2:1. The desired 2-cyanopyridinic products are recovered by condensation of effluent gas as described above. In the foregoing manner, cyanogen is reacted with each of: 2-methyl-1,3-butadiene; 1,3-pentadiene; 2,4-hexadiene; 3,5-octadiene; 2-methyl-1,3-pentadiene; 1-fluoro-1,3-butadiene; 1-chloro-1,3-pentadiene; 1-cyano-1,3-butadiene; 1-cyano-1,3-pentadiene; 1-ethoxy-1,3-butadiene; 1-methoxy-1,3-pentadiene; 2-iodo-1,3-butadiene; 2-chloro-1,3-pentadiene; 1,4-dichloro-1,3-butadiene; 2,3-dichloro-1,3-butadiene; 2-cyano-1,3-butadiene; 2-cyano-1,3-pentadiene; 2-methoxy-1,3-butadiene; 2-methoxy-1,3-pentadiene; 1,4-di(bromomethyl)-1,3-butadiene; 1-trifluoromethyl-1,3-butadiene; 1-(2'-phenylethyl)-1,3-butadiene; 1,4-dicyano-1,3-butadiene; 1,2-dichloro-3-methyl-1,3-butadiene; 2-chloro-3-cyano-1,3-butadiene; 3-chloro-1-methoxy-1,3-butadiene; 1-methoxy-3-methyl-1,3-butadiene; and 2-bromo-3-methoxy-1,3-butadiene.

I claim:

1. The process of making a 2-cyanopyridine, by contacting Reactant I, cyanogen, with Reactant II, a 1,3-butadiene represented by the formula

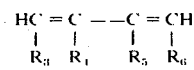

wherein two of $R_3$, $R_4$, $R_5$ and $R_6$ are hydrogen substituents and the other two are independently hydrogen, halo- or lower alkyl-substituents, at a temperature of about 450°C. to about 700°C., in the Reactant I:Reactant II molar ratio of greater than about 2:1.

2. The process of claim 1 wherein the reactants are subjected, in the reaction zone, to a pressure of 1 to about 60 atmospheres.

3. The process of claim 1 wherein Reactant I is independently preheated to above the reaction temperature and Reactant II is independently preheated to a temperature just under its dimerization point and the reactants are then added to the reaction zone at their respective preheat temperatures.

4. The process of claim 1 wherein the reactants are contacted from about 1 to about 75 seconds at the reaction temperature.

5. The process of claim 1 wherein the Reactant I: Reactant II mole ratio is about 3:1 to about 10:1.

6. The process of claim 1 wherein the reactants are contacted at a temperature of about 500°C. to about 575°C.

7. The process of claim 6 wherein the reactants are contacted at reaction temperature for about 5 to about 35 seconds.

8. The process of claim 2 wherein the pressure is 1 is to about 5 atmospheres.

9. The process of claim 7 wherein cyanogen is contacted with 1,3-butadiene in the mole ratio of about 3:1 to about 10:1 and at a pressure of 1 to about 5 atmospheres.

10. The process of claim 9 wherein Reactant I has been independently preheated to about 600°–700°C. and Reactant II has been independently preheated to about 300°–325°C. prior to contacting.

11. The process of claim 10 wherein the Reactant I: Reactant II mole ratio is about 3:1 to about 10:1; reactants are contacted at a temperature of about 500° to about 575°C. for about 5 to about 35 seconds and Reactant II is one of 1,3-butadiene; 1,3-pentadiene 1,3-hexadiene and 3-methyl-1,3-pentadiene.

12. The process of claim 10 wherein Reactant II is 1,3-butadiene.

13. The process of claim 6 wherein the Reactant I: Reactant II mole ratio is about 2:1 to about 3:1, Reactant II is 1,3-butadiene; and the reactants are contacted for about 19 to about 32 seconds under about 0.5 to about 10 psig.

14. The process of claim 1 wherein two of $R_3$, $R_4$, $R_5$ and $R_6$ are hydrogen substituents and the other two are independently hydrogen, methyl- or ethyl- substituents.

15. The process of claim 14 wherein Reactant II is 1,3-pentadiene.

* * * * *

UNITED STATES PATENT OFFICE
CERTIFICATE OF CORRECTION

PATENT NO. : 3,903,097
DATED : September 2, 1975
INVENTOR(S) : Donald J. Perettie It is certified that error appears in the above-identified patent and that said Letters Patent are hereby corrected as shown below:

Column 8, line 26 (Claim 11), delete "10" and insert --14--;

Column 8, line 32 (Claim 12), delete "10" and insert --14--.

Signed and Sealed this second Day of March 1976

[SEAL]

Attest:

RUTH C. MASON
*Attesting Officer*

C. MARSHALL DANN
*Commissioner of Patents and Trademarks*